United States Patent [19]
Hepp et al.

[11] 3,766,330

[45] Oct. 16, 1973

[54] DISC RECORDING STYLUS DRIVER

[75] Inventors: Otto F. Hepp, Los Angeles; John P. Jarvis, Northridge, both of Calif.

[73] Assignee: Aero Service Corporation, Philadelphia, Pa.

[22] Filed: Apr. 28, 1972

[21] Appl. No.: 248,542

[52] U.S. Cl. .................................... 179/100.4 C, 179/100.4 A, 179/100.4 ST, 179/100.41 D, 179/100.41 K

[51] Int. Cl. ............................ G11b 3/00, H04r 9/16

[58] Field of Search ............ 179/100.4 C, 100.4 ST, 179/100.4 A, 100.41 D, 100.41 K; 317/123; 310/15; 336/185, 205

[56] References Cited

UNITED STATES PATENTS

| | | | |
|---|---|---|---|
| 1,947,164 | 2/1934 | Morrison | 179/100.41 D |
| 3,142,729 | 7/1964 | Davis | 179/100.41 K |
| 2,814,581 | 11/1957 | Flynn | 336/205 |
| 2,141,584 | 12/1938 | Wittander | 179/100.41 D |
| 1,799,799 | 4/1931 | Jones | 179/100.41 D |

OTHER PUBLICATIONS

Tremaine, The Audio Cyclopedia, 2nd Edition, 1969, pp. 703–705.

*Primary Examiner*—Raymond F. Cardillo, Jr.
*Attorney*—W. R. Thiel et al.

[57] ABSTRACT

A drive coil assembly is provided for driving a stylus of a disc recording system. The assembly comprises a support member having an axis and an annular coil having a plurality of turns of conductive wire bonded together and to an end of the support member. The member is positioned relative to an annular gap between two pole pieces of a magnet so that the coil occupies a substantial radial cross section of the gap. Preferably, the member includes an end flange to which the coil is attached. The coil is formed on a removable mandrel, or the like, so that the resulting drive coil assembly has a structure which does not include a bobbin.

10 Claims, 7 Drawing Figures

DISC RECORDING STYLUS DRIVER

This invention relates to improvements in disc recording apparatus, and particularly to improvements in drive coil assemblies for driving a stylus of a disc recording system.

Disc recording apparatus includes a stylus, such as a heated stylus, adapted to cut a track in a disc for mechanical reproduction of sound. The stylus is moved along an axis by a drive coil adapted to reciprocate along the axis in accordance with input signals representative of the sound to be reproduced. For stereo reproduction, two such driving coils are connected to the stylus to move the stylus along two mutually perpendicular axes.

Heretofore, the driving coil was wound on a metallic bobbin, which in turn was positioned in a gap between two pole pieces of a permanent magnet. The motion of the bobbin was controlled by the strength of the signal applied to the drive coil, the number of turns of winding on the coil, the strength of the magnetic flux across the gap, and the weight of the bobbin. In prior drive coil apparatus, part of the space within the gap was occupied by the bobbin so that the magnetic flux between the pole pieces across the gap had to pass through both the bobbin and the coil. As a result, the coil did not utilize the full capabilities of the flux density. In addition, the bobbin formed a "shorted turn" across the coil which increased the losses in the coil at high frequencies.

It is an object of the present invention to provide a drive coil for disc recording apparatus in which the coil occupies a substantial portion of the cross section of a gap to thereby increase the efficiency of the apparatus.

It is another object of the present invention to provide a drive coil mounted on a member, which coil is self supporting and attached to the member without the use of a bobbin.

It is another object of the present invention to provide a low impedance coil for driving a cutting stylus for a recording system in which the coil occupies a substantial portion of the cross section of the gap between two pole pieces.

It is another object of the present invention to provide a drive coil apparatus for a recording system which is lighter than prior drive coils.

Another difficulty encountered with prior recording apparatus resides in the fact that as the signal frequency increased to the prior drive coil, the impedance of the coil likewise increased due to the inductive reactance of the coil. As a result, power amplifiers and the like were loaded with a varying impedance.

It is yet another object of the present invention to provide compensation circuitry for use with a drive coil to maintain the impedance on the output of an amplifier for a recording system substantially constant over substantially the entire frequency range of signals applied to the coil.

In accordance with the present invention, a drive coil is provided having a plurality of turns of wire. Means is provided for holding the turns together, and means is provided for attaching the coil to a support member. The coil is positionable to reciprocate along an axis in a gap between a pair of pole pieces to thereby reciprocate the support member. The arrangement of the apparatus is such that the coil, when positioned in the gap between the pole pieces, occupies a substantial portion of the cross section of the gap.

One feature of the present invention resides in the provision of a compensating circuitry adapted to be connected to a series with the drive coil so that the overall impedance of the compensating circuit and the drive coil is substantially constant over the entire frequency range of signals applied to the drive coil.

Another feature of the present invention resides in the fact that the drive coil and the associated member is lighter than prior drive coils so that the apparatus more effectively responds to signals applied to the drive coil.

Another feature of the present invention resides in the fact that since the drive coil occupies a substantial portion of the gap between the pole pieces, the efficiency of the drive coil arrangement in accordance with the present invention, is substantially greater than prior drive coils.

Another feature of the present invention resides in a method for manufacturing a drive coil in accordance with the present invention wherein a mandrel is attached to the support member and the drive coil is formed by wrapping turns of wire onto the mandrel. The wire is bonded together and to the member therby attaching the turns together and to the member. The mandrel may thereafter be removed.

The above and other features of this invention will be more fully understood from the following detailed description and the accompanying drawings, in which.

Figures 1, 2, 7:
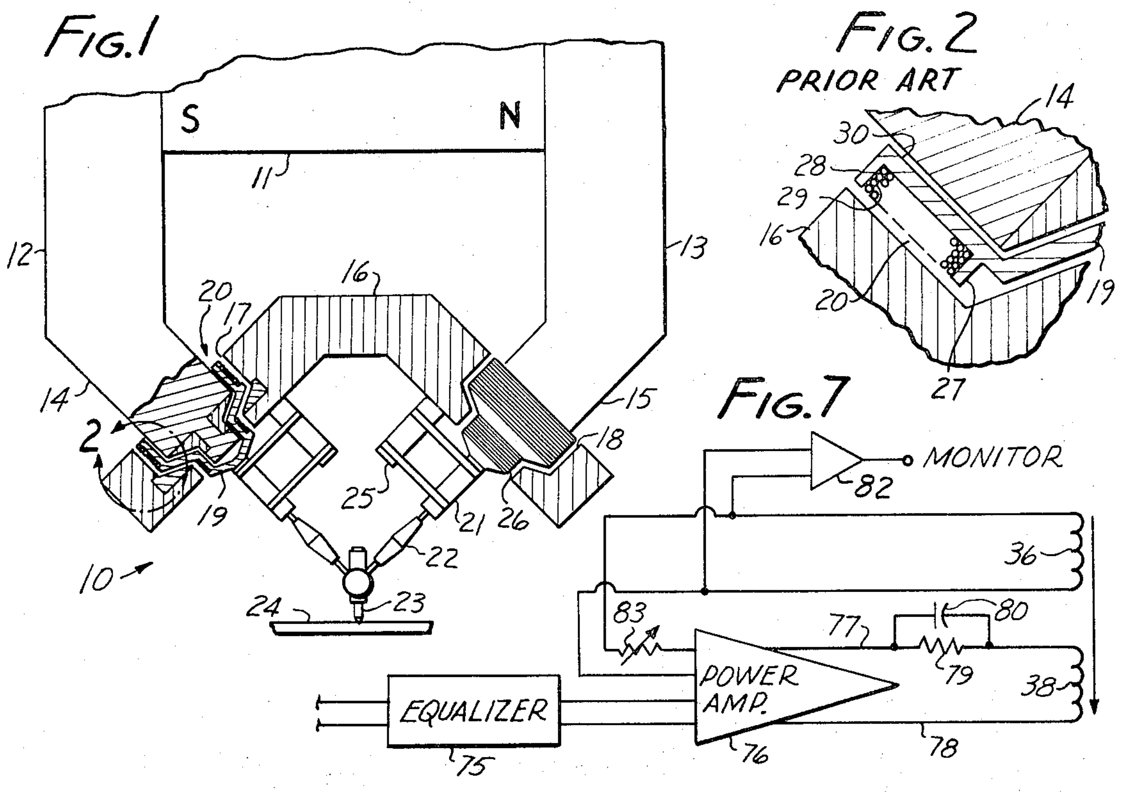
FIG. 1 is an elevation view, partly in cutaway cross section, of recording apparatus for controlling movement of a atylus.
FIG. 2 is an enlarged section view of portion 2 of FIG. 1, showing a prior art drive coil assembly.
FIG. 7 is a block circuit diagram of a compensating circuit for use with the drive coil assembly illustrated in FIG. 3.

Referring to FIG. 1 there is illustrated cutting apparatus 10 having a permanent magnet 11. Pole pieces 12 and 13 are connected to opposite ends of magnet 11, each having a substantially cylindrical portion 14, 15 disposed at an angle of approximately 45° to the vertical so that the axes of portions 14, 15 are approximately 90° degrees apart. A center pole piece 16 is provided with a pair of bores 17, 18 adapted to surround at least a portion of pole portions 14, 15. Identical members 19 are positioned within the gap 20 formed between the pole piece portions 14, 15 and the center pole piece 16. Preferably, member 19 includes an extended cylindrical portion 21 adapted to be connected by linkage 22 to stylus 23. Each member 19 is capable of reciprocating along an axis parallel to linkages 22 to move stylus 23 along the respective axis. Stylus 23 is positioned to cut into disc 24 to manufacture a permanent reproducible sound recording on the disc.

Members 19 are positioned within gaps 20 by means of suitable supports 25 so that each housing may reciprocate along the respective axis. As shown in FIG. 1, it is preferred that a feedback winding 26 is wound onto member 19 and supported thereby, the purpose of this winding will be more fully explained hereinafter.

FIG. 2, which is a cross-section of a portion of FIG. 1 on an enlarged scale, illustrates prior art drive coil apparatus. As shown in FIG. 2, housing 19 includes a pair of outwardly extending annular flanges 27 and 28 which form a bobbin upon which drive winding 29 is wound. The winding is wound over the cylindrical portion 30 of member 19 between flanges 27 and 28. The portion of member 19 forming the bobbin is positioned within the gap 20 between poles 14 and 16. As shown in FIG. 2, the body of member 19 forming the bobbin occupies a substantial portion of the gap. In addition, the bobbin forms a conductive shorted winding for the coil.

Figure 3:
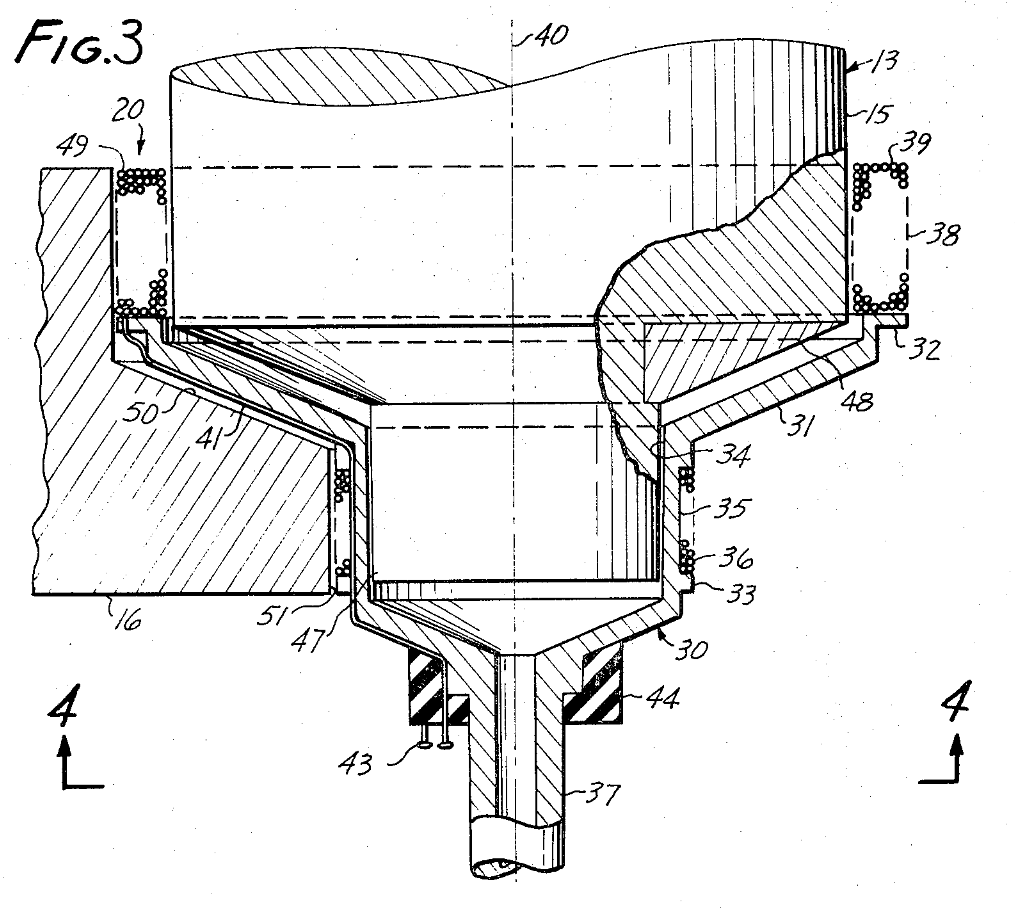
FIG. 3 is an elevation view, partly in cutaway cross section, of a drive coil assembly in accordance with the presently preferred embodiment of the present invention.

With reference to FIG. 3 there is illustrated drive winding apparatus in accordance with the presently preferred embodiment of the present invention. The apparatus comprises a support member 30 having a frusto-conical portion 31 and an outwardly extending radial flange 32 at the end of portion 31 having the largest diameter. A cylindrical portion 33 extends from the region at least diameter of portion 31. A cylindrical counterbore 34 is disposed within cylindrical portion 33 and an annular recess 35 is provided in portion 33 to support feedback coil 36 wound into groove 35 for purposes to be hereinafter explained. Member 33 also includes an axial arm 37 adapted to be connected to a stylus, such as stylus 23 as shown in FIG. 1 by means of suitable linkage, such as linkage 22. As shown in FIG. 1 arm 37 may be supported by suitable support means to center pole 16.

Drive winding 38 comprises a plurality of turns of wire 39 wrapped in a cylindrical configuration about axis 40 of member 30. Each turn of wire 39 is held to the next adjacent turn of wire by a suitable epoxy resin which in turn fastens the lowermost turns to flange 32. Preferably, and as shown particularly in FIGS. 3 and 4, slots 41 are provided in member 30 so that wire 42 from coil 38 may be connected to terminals 43 supported by cap 44. Additionally, suitable slots 45 may be provided for connecting feedback winding 36 to other terminals 46.

Pole piece 13 includes a substantially cylindrical portion 15 adapted to be received into the region defined by the smallest diameter of winding 38. In addition a second cylindrical portion 47 is adapted to be received in bore 34 of member 30. Preferably, a frusto-conical member 48 is fastened to the pole piece adjacent frusto-conical portion 31 of the member. For example, pole piece 13 may be constructed of a suitable ferrous material, and frusto-conical member may be constructed of copper. Pole piece 16, which may for example comprise the center pole of the recording apparatus, includes a substantially cylindrical bore 49 adapted to receive the outside diameter of coil 38. A frustoconical surface 50 forms a transition between bore 49 and bore 51 which in turn receives coil 36. As shown in FIG. 3, coil 38 occupies a substantial portion of the gap between surfaces 15 and 49 of pole pieces 13 and 16.

Figures 4, 5, 6:
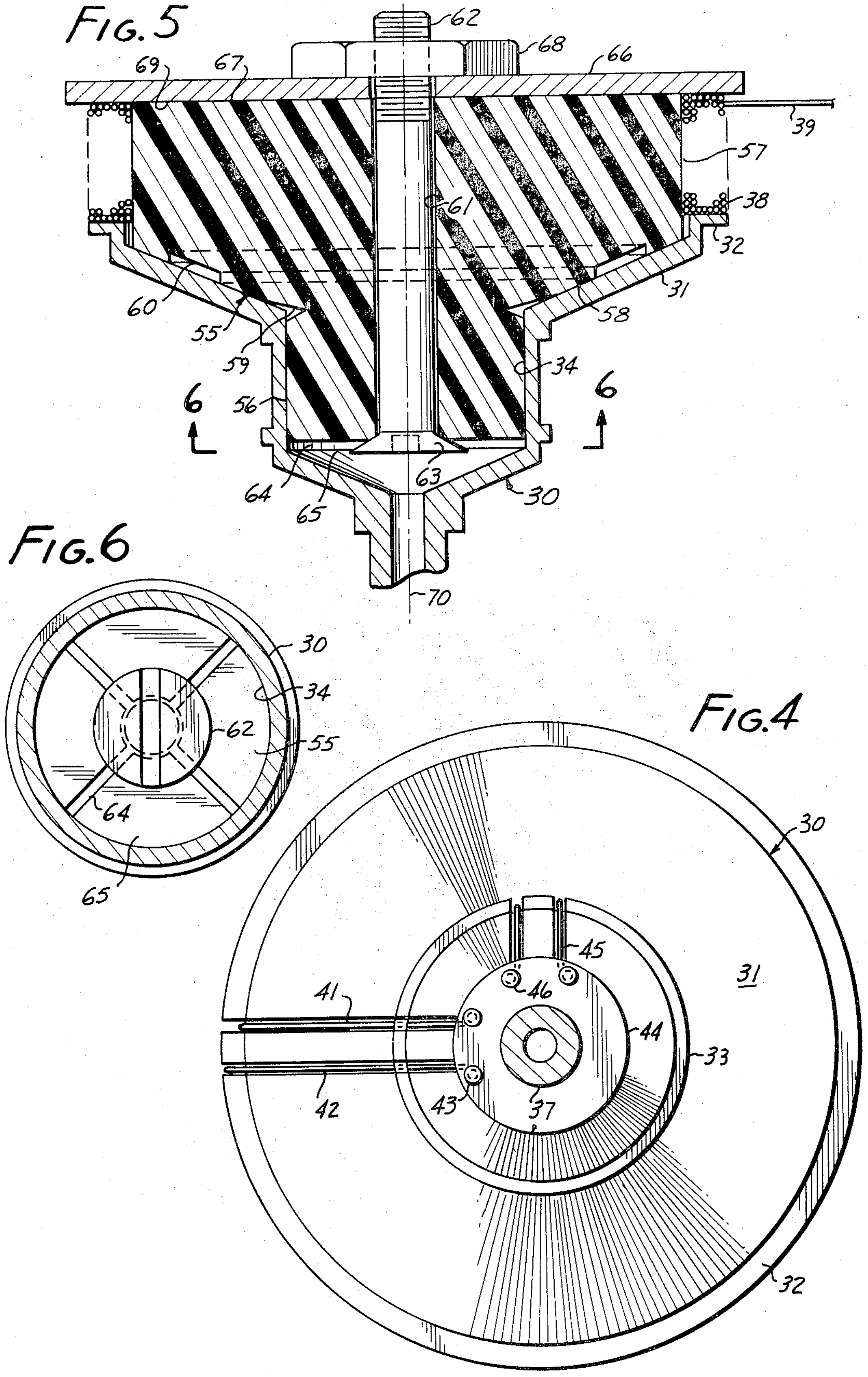
FIG. 4 is an end view of the drive coil assembly taken at line 4—4 in FIG. 3.
FIG. 5 is a section view of a mandrel and support member showing the method of manufacture of the drive coil assembly shown in FIG. 3.
FIG. 6 is a section view taken at line 6—6 in FIG. 5.

FIGS. 5 and 6 illustrate the manner by which winding 38 may be wound and attached to member 30. Mandrel 55 comprises a first cylindrical portion 56, a second cylindrical portion 57, and a frusto-conical portion 58 forming a transition between portions 56 and 57. Preferably, a chamfer 59 is formed at the intersection of cylindrical portion 56 and frusto-conical portion 58. Preferably, a groove 60 is formed in surface 58 to permit minor radial movement of cylindrical portion 56 without effecting the cylindrical properties of portion 57. Mandrel 55, which is preferably constructed of a suitable resilient plastic, includes a bore 61 through which the shank of fastener 62 is positioned. The head of fastener 62 includes a frusto-conical surface 63 adapted to bear against the end surface 65 of the mandrel. Slots 64 are formed in the end surface 65 so that upon application of an axial force to fastener 62, frusto-conical surface 63 of the head of the fastener bears against the upper surface 65 of mandrel 55 to expand cylindrical portion 56 radially to form an interference fit against bore 34 of member 30. Washer 66 having a diameter substantially larger than that of the mandrel and preferably at least as large as the outer diameter of flange 32 is positioned against end surface 67 of the mandrel, and threaded fastener 68 is fastened to the threads of fastener 62. Rotation of fastener 68 with respect to fastener 62 applies a compressive force between the head of fastener 62 and the upper surface 65 of the mandrel thereby expanding cylindrical portion 56 of the mandrel radially to form an interference fit against bore of mandrel 30.

Wire 39, which is preferably a suitable No. 33 anodized aluminum wire having a diameter of approximately 7 mils. is precoated with a suitable epoxy resin and wound about surface 57 of mandrel 55 to fill the space flange 32 and washer 66. Preferably, surface 57 of mandrel 55 and surface 69 of washer 66 are precoated with a suitable release wax (not shown) so that the mandrel and washer may be disassembled from the apparatus upon completion of the winding of wire 39 and curing of the resin. Mandrel 55 and mandrel 30 are rotated about axis 70 so that wire 39 is wrapped into the space between flange 32 and washer 69 over surface 57 of mandrel 55. The epoxy resin bonds each turn of wire 39 go the next adjacent turn, and the turns adjacent flange 32 are bonded to the flange thereby completing the assembly. Thereafter, the mandrel may be disassembled and removed.

As wire 39 is wrapped into the region between washer 66 and flange 32, the wire forms an even layer over the mandrel to accurately define the inside diameter of coil 38. Control of the outside diameter of winding 38 is achieved by oridnary winding techniques.

One feature of the present invention resides in the fact that the driving coil in accordance with the present invention occupies a substantial portion of the radial cross section of the gap between pole pieces 16 and 15. Thus, and as shown in FIG. 3, the cross section of gap 20 between pole pieces 15 and 16 is substantially occupied by coil 38. For example, the inside diameter of bore 49 of pole piece 16 may be of the order of about 0.553 inches whereas the outside diameter of portion 15 of pole piece 13 may be of the order of about 0.471 inches, thereby resulting in a gap of approximately 41 mils between the poles. In prior drive coil apparatus, the bobbin occupied approximately 7 mils and the coil occupied approximately 20 mils of the 41 mil gap, leaving a 7.0 mil gap on each side of the assembly. As a result, approximately 49 percent of the gap was occupied by the coil. With a drive coil in accordance with the present invention, the drive coil may occupy approximately 32 mils of the 41 mil gap thereby leaving a space of approximately 4.5 mils between the coil and each pole piece in the gap. As a result, the coil occupies approximately 78 percent of the gap. Since the flux density across the gap is proportional to the inverse square of the distance across the gap, the coil according to the present invention more effectively uses the available flux density than did prior coils. As a result, the efficiency of the drive coil in accordance with the present invention is substantially greater than that of prior devices.

It can be shown that the efficiency of a drive coil for a recording system is affected by the number of ampere-turns of the coil, the proximity of the coil to the pole pieces, and the weight of the drive coil assembly. The elimination of the bobbin structure present in prior art drive coil assemblies enables the drive coil assembly in accordance with the present invention to possess a greater ampere-turns, a closer physical relationship with the pole pieces, and less weight. The increased ampere-turns may be achieved by increasing the wire size over that used in prior coil assemblies, thereby reducing the impedance of the coil to increase the current through the coil for a given voltage signal. Alternatively, if the same size wire is used as in prior devices, the number of turns will be increased, thereby increasing the ampere-turns. In any event, the force imposed on coil 38 to move the assembly axially along axis 40 is increased. Further, since the coil occupies a substantial portion of the gap between the pole pieces, the existing flux density in the gap is more fully utilized.

Prior drive coil assemblies, including the bobbin, drive coil and feedback coil weighed of the order of about 0.43 grams. The drive coil assembly according to the present invention weighs of the order of about 0.37 grams. As a result, the mass of the drive coil assembly in accordance with the present invention is lower than prior assemblies thereby increasing the response of the assembly to movement. It can be shown that the rate of change of velocity of the coil assembly is inversely proportional to its mass in accordance with the following relationship:

$$dv/dt = F/m$$

where $dv/dt$ is the rate of change of velocity of the coil assembly, $F$ is the force imposed on the assembly, and $m$ is its mass. Further, and as explained above, the force, $F$, is proportional to the ampere-turns of the coil. Since the coil according to the present invention exhibits an increased number of ampere-turns, the force imposed on the coil for a given signal is greater than that realized in prior art devices. Also, since the force on the coil is greater and its mass is lower, the response of the coil $dv/dt$, is substantially greater than prior art devices.

FIG. 7 illustrates a block circuit diagram of apparatus for operating drive coil 38. As shown in FIG. 7, equalizer 75 includes in input from a suitable signal source, such as a tape deck (not shown). Equalizer 75 compensates for the so-called RIAA equalizing standards. The output from equalizer 75 is forwarded through power amplifier 76 which imposes signal outputs on leads 77 and 78. Lead 77 is connected through resistor 79 and capacitor 80, which are connected in parallel, to one side of coil 38, and lead 78 is connected directly to the other side of drive coil 38. The output from feedback coil 36 is connected directly to amplifier 82 which provides a monitor output for monitoring the signals being recorded. In addition, the coil 36 is connected through variable resistor 83 to power amlifier 76 for negative feedback compensate of power fluctuations in a recorded signal.

One feature of the present invention resides in the fact that the elimination of the bobbin from coil 38 eliminates the "shorted winding" which is present in coils wound on metallic bobbins. Thus, in prior drive coil assemblies, the metallic bobbin presented a shorted winding which affected the impedance characteristics of the drive coil, especially at higher frequencies, such as of the order of about 15 to 30 KHz. The elimination of the shorted winding from the drive coil in accordance with the present invention causes the coil to appear as a true inductor at substantially all frequencies being recorded. Thus, the coil is more adaptable to matching of impedance characteristics of the winding to the output characteristics of power amplifier 76. Thus, a drive coil in accordance with the present invention has a D.C. impedance of approximately 3 ohms and an inductance of approximately 90 $\mu$hy. As the frequency increases, the inductive reactance of the coil increases, and the current phase of the signal shifts negatively. However, the RC circuit connected in series with the drive coil enables a substantially constant impedance to be imposed on the output of power amplifier 76. Thus, the resistor 78 which may have a magnitude of 4 ohms is shunted by a 5 $\mu$fd capacitor. As the frequency of the signal on the output of power amplifier 76 increases, the impedance of capacitor 80 decreases, thereby shunting resistor 79. In addition, the current phase shift across capacitor 80 is a positive phase shift so that the output of power amplifier 76 remains substantially constant over the entire frequency range of signals from the amplifier with a substantially constant phase shift on the output terminals.

In the use of the coil assembly according to the present invention, signals from the power amplifier are supplied to the drive coil to induce a change in the magnetic field between the pole pieces. As a result, a relative movement occurs between the coil and the pole pieces thereby causing the coil assembly to move along the axis of the coil. The degree of movement and the period of reciprocation are dependent upon the strength and frequency of the applied signal. As a result, the cutting stylus is moved to cut a track in the record disc, the track having mechanical characteristics enabling reproduction of the signal by suitable playback equipment. The recording signal is monitored by the feedback coil which senses movement of the coil assembly to produce a feedback signal. The feedback signal may be used for negative feedback to the recording system, as well as for monitoring purposes.

The present invention thus provides drive coil apparatus which is more efficient than prior drive coil assemblies for recording apparatus. The apparatus is effective in use and may be easily constructed utilizing the methods in accordance with the present invention. Comparative tests on drive coils have shown that prior drive coil assemblies had a secondary resonance at about 14.5 KHz whereas drive coil assemblies according to the present invention have a secondary resonance at about 15.5 KHz, thereby providing improved recording characteristics.

This invention is not to be limited by the embodiment shown in the drawings and described in the description, which is given by way of example and not of limitation, but only in accordance with the scope of the appended claims.

What is claimed is:

1. A record disc cutting device including a recording stylus, comprising:
   a. an electromagnetic center pole including at least one bored circular hole therein;
   b. a circular magnetic di-pole having one of its poles axially concentric and movably disposed within said bored hole, forming a working gap concentric with and disposed between said center pole and said one pole of said magnetic di-pole;
   c. said gap consisting in its entire 360° circumference (i) of a drive winding concentric with said gap, said winding held together by a bonding agent, and (ii) of an air gap disposed on either radial side of said drive winding; and
   d. support means maintaining said winding in said gap and coupling said winding with said recording stylus.

2. The device as claimed in claim 1 wherein said bonding agent is an epoxy resin.

3. Apparatus according to claim 1 wherein said bored hole includes a frusto-conical portion and a cylindrical portion, and a second winding supported on said cylindrical portion.

4. A device according to claim 1 further including a signal source means adapted to supply electrical signals to said winding to cause said winding to reciprocate about an axis of said winding in a predetermined manner, said winding having a predetermined direct current resistance and a predetermined inductance, said apparatus further including an impedance compensating circuit connected between said winding and said source means, said circuit comprising a resistor and a capacitor connected in parallel, said capacitor having a variable impedance compensatory of that impedance of said circuit and of said winding taken together, whereby the impedance over the entire frequency range of signals from said signal source means remains substantially constant.

5. A recording system having a cutting stylus for forming a sound reproduceable track in a disc comprising:

a. a permanent magnet having a first and a second cylindrical poles, each said pole including an axis and disposed within first and second, respectively, cylindrical pole bores, said magnet and said bores forming a coaxial air gap therebetween;
   b. generally cylindrical support means for supporting said cutting stylus, said support means including an axis and rotatably mounted about and coaxial with each of said poles, respectively; and
   c. a drive winding coil coaxial with each said magnet, said coil being disposed on said support means, and radially facing said magnet and said poles in said air gap for the 360° circumference of said coil.

6. Apparatus according to claim 5 wherein said poles and said pole bores include a frusto-conical portion and a cylindrical portion, and a second coil supported on said cylindrical portion.

7. The system as claimed in claim 5 wherein said drive winding coil includes a plurality of turns, said turns being bonded fixedly together and to said support means by an epoxy resin.

8. System according to claim 5 further including source means adapted to supply electrical signals to said coil to cause said coil to reciprocate about said axis in a predetermined manner, said coil having a predetermined direct current resistance and a predetermined inductance, said system further including an impedance compensating circuit connected between said coil and said source, said circuit comprising a resistor and a capacitor connected in parallel, said capacitor having a variable impedance compensatory of that impedance of said circuit and of said coil taken together, whereby the impedance over the entire frequency range of signals from said signal source means remains substantially constant.

9. Apparatus according to claim 5 wherein the turns of said wire forming said external diameter of said coil are separated from the outer annular wall of said gap by an air gap having a first predetermined radial dimension and the turns of wire forming said internal diameter of said coil are separated from the inner annual wall of said gap by an air gap having a second predetermined radial dimension.

10. Apparatus according to claim 9 wherein said first and second predetermined radial dimensions are each of the order of about 4 to 5 mils.

* * * * *

PO-1050
(5/69)

UNITED STATES PATENT OFFICE
CERTIFICATE OF CORRECTION

Patent No. 3,766,330 Dated October 16, 1973

Inventor(s) OTTO F. HEPP and JOHN P. JARVIS

It is certified that error appears in the above-identified patent and that said Letters Patent are hereby corrected as shown below:

IN THE SPECIFICATION:

In Column 4, line 33, after the word "space" and before the word "flange", the word --between-- should be inserted;

In Column 5, line 59, the word "in" should be --an--; and

In Column 6, line 4, "amlifier" should be --amplifier--.

Signed and sealed this 26th day of March 1974.

(SEAL)
Attest:

EDWARD M.FLETCHER,JR.
Attesting Officer

C. MARSHALL DANN
Commissioner of Patents